Oct. 1, 1946.   R. L. AKERS   2,408,360
DRAFT COUPLING AND POWER STEERING UNIT
Filed June 29, 1945
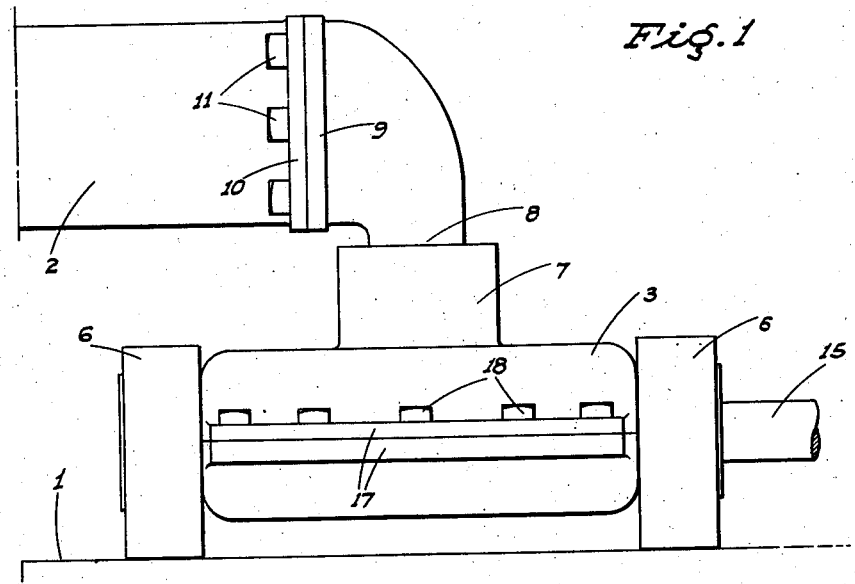
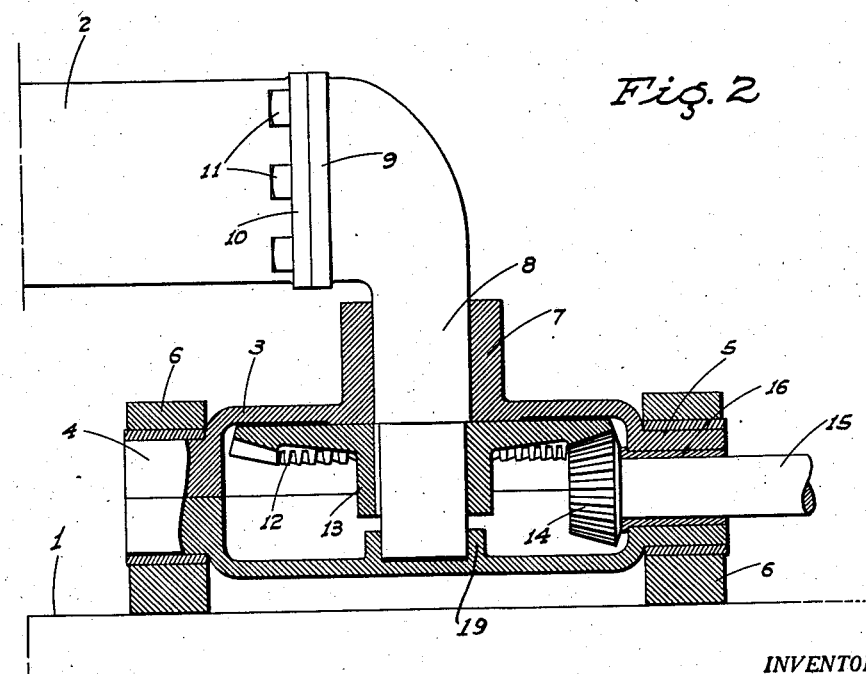
INVENTOR.
R. L. Akers
BY
ATTYS Patented Oct. 1, 1946

2,408,360

UNITED STATES PATENT OFFICE 2,408,360

DRAFT COUPLING AND POWER STEERING UNIT

Richard Lawrence Akers, Peoria, Ill., assignor to R. G. Le Tourneau, Inc., Stockton, Calif., a corporation of California Application June 29, 1945, Serial No. 602,347

7 Claims. (Cl. 180—79.4)

This invention is directed to, and it is an object to provide, a novel draft coupling and power steering unit arranged for connection between a tractor and the forwardly projecting draft tongue or yoke of a trailer.

Such a combination, but with a draft coupling and power steering unit of modified design, is shown for example in copending U. S. patent application entitled Power steer for vehicles, Serial No. 572,684, filed January 13, 1945, Patent No. 2,400,218, granted May 14, 1946.

A further object of the present invention is to provide a draft coupling and power steering unit adapted to connect a tractor and trailer in steerable yet laterally tiltable relation; the power steering mechanism of the unit being arranged to function properly and effectively regardless of normal relative lateral tilt between the tractor and trailer.

An additional object is to provide a draft coupling and power steering unit, as in the preceding paragraph, in which the unit includes a housing, mounted on the tractor for relative lateral tilting about a longitudinally extending, substantially horizontal axis; an upstanding post rotatably mounted in and projecting upwardly from the housing for rigid connection with the trailer; a reversibly driven shaft entering said housing axially; and gears in the housing connecting the drive shaft and post whereby the latter is rotated to steer the tractor regardless of the normal relative lateral tilt between the latter and the trailer.

Another object of the invention is to provide a draft coupling and power steering unit which is very simple in design but rugged and reliable in construction, as is necessary for the purpose for which the unit is used.

These objects are accomplished by means of such structure and relative arrangement of parts as will fully appear by a perusal of the following specification and claims.

In the drawing similar characters of reference indicate corresponding parts in the several views:

Figure 1 is a side elevation of the draft coupling and power steering unit as mounted between the rear end of a tractor and the forward end of a trailer.

Figure 2 is an elevation, mainly in section, of the unit.

Referring now more particularly to the characters of reference on the drawing, the draft coupling and power steering unit is adapted for connection between the deck 1 on the rear of a tractor, and the forwardly projecting draft tongue or yoke 2 of a trailer, and said unit comprises the following structural arrangement:

An enclosed gear housing 3, which is substantially circular in plan, is disposed in spaced relation above the deck 1 of the tractor, and said housing includes, at opposite ends, oppositely and longitudinally extending trunnions 4 and 5. The trunnions 4 and 5 are turnably supported in heavy-duty ears or bearing brackets 6 which are fixed in connection with and upstand from the deck 1. As so mounted the gear housing 3 is supported for lateral tilting movement about a substantially horizontal, longitudinally extending axis.

Substantially centrally thereof the gear housing 3 is formed with an upwardly projecting bearing neck 7, and an upstanding post 8 is suitably journaled in the housing 3 in a bearing 19 and extends in turnable relation upwardly through said bearing neck 7 to a termination thereabove.

Above the bearing neck 7 the post 8 is formed with a flat, vertical, and normally rearwardly facing attachment plate 9 to which a corresponding attachment plate 10 on the forward end of the draft tongue or yoke 2 of the trailer is coupled in detachable relation by securing bolts 11.

By reason of the above described structure the tractor is coupled in steerable but laterally tiltable relation to the trailer; the post 8 being relatively rotated by the following power mechanism in order to accomplish steering of the tractor relative to the trailer:

A bevel gear 12 is disposed in the gear housing 3 and includes a vertical axis hub 13 surrounding and fixed in connection with the post 8. The bevel gear faces downwardly and runs in mesh with a horizontal axis, bevel pinion 14 disposed in the forward portion of the housing 3. The bevel pinion 14 is fixed on the inner end of a drive shaft 15 which extends axially through the trunnion 5, being carried in a suitable bearing 16. The shaft 15 is selectively and reversibly driven by tractor engine actuated power transmission means (not shown), but which may be of any suitable type.

With powered rotation of the shaft 15 in one direction or the other, relative turning of the post 8 in the bearing neck 7 results, causing steering of the tractor in a corresponding direction; such steering being accomplished regardless of the relative lateral tilt between the tractor and trailer, and for the reason that such lateral tilting merely rotates the gear housing 3 axially about the drive shaft 15 and thus does not interfere with proper driving engagement of the bevel pinion 14 with the bevel gear 12.

For the purpose of ease of assembly the gear housing 3 is shown as being of sectional construction, including a top and bottom section having matching flanges 17 secured together by bolts 18.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A tractor-trailer draft coupling and power steering unit comprising a member adapted to be mounted on the tractor for relative lateral tilting about a longitudinal axis, a post adapted to be fixed in connection with the trailer, said post being mounted on and projecting from the member for relative rotation about an upstanding axis, a gear secured concentrically on the post, and a reversibly driven, shaft supported pinion in mesh with the gear, said pinion and laterally tiltable member being coaxial along the longitudinal axis of tilting of the latter.

2. A tractor-trailer draft coupling and power steering unit comprising a member adapted to be mounted on the tractor for relative lateral tilting about a longitudinal axis, a post adapted to be fixed in connection with the trailer, said post being mounted on and projecting from the member for relative rotation about an upstanding axis, said member being hollow and the post extending thereinto, and drive means connected to the post within the member and operable to effect such relative rotation of the post without affecting such lateral tilting movement of the member.

3. A tractor-trailer draft coupling and power steering unit comprising a member adapted to be mounted on the tractor for relative lateral tilting about a longitudinal axis, a post adapted to be fixed in connection with the trailer, said post being mounted on and projecting from the member for relative rotation about an upstanding axis, said member being hollow and the post extending thereinto, a reversible drive shaft projecting into the member and disposed co-axially with the said longitudinal axis of tilting thereof, and drive connections between the shaft and post within the member.

4. A tractor-trailer draft coupling and power steering unit comprising a member adapted to be mounted on the tractor for relative lateral tilting about a longitudinal axis, a post adapted to be fixed in connection with the trailer, said post being mounted on and projecting from the member for relative rotation about an upstanding axis, said member being hollow and the post extending thereinto, a reversible drive shaft projecting into the member and disposed co-axially with the said longitudinal axis of tilting thereof, and drive connections between the shaft and post within said member; said drive connections comprising a gear on the post and a pinion on the shaft.

5. A tractor-trailer draft coupling and power steering unit comprising a member adapted to be mounted on the tractor for relative lateral tilting about a longitudinal axis, a post adapted to be fixed in connection with the trailer, said post being mounted on and projecting from the member for relative rotation about an upstanding axis, said member being hollow and the post extending thereinto, a reversible drive shaft projecting into the member and disposed co-axially with the said longitudinal axis of tilting thereof, and drive connections between the shaft and post within said member; said drive connections comprising a bevel gear on the post and a bevel pinion on the shaft.

6. A tractor-trailer draft coupling and power steering unit comprising a housing adapted to be mounted on the tractor for relative lateral tilting about a longitudinal axis, a post journaled in the housing and projecting therefrom for relative rotation about an upstanding axis, the projecting portion of the post being adapted to be fixed in connection with the trailer, and drive means for imparting such relative rotation to the post connected thereto within the housing; the housing including oppositely extending trunnions about which said housing is adapted to tilt, and said drive means including a drive shaft entering the housing co-axially through one of said trunnions.

7. A tractor-trailer draft coupling and power steering unit comprising a housing having oppositely projecting trunnions adapted to be journaled on a tractor for relative lateral tilting of said housing about a longitudinal axis, a post journaled in the housing and projecting therefrom for rotation about an upstanding axis, the projecting part of the post being adapted to be fixed in connection with the trailer, a gear secured concentrically on the post in the housing, a reversible drive shaft projecting into the housing co-axially through one of said trunnions, and a pinion on the shaft in mesh with the gear within the housing.

RICHARD LAWRENCE AKERS.